(12) United States Patent
Okamoto et al.

(10) Patent No.: US 10,441,899 B2
(45) Date of Patent: Oct. 15, 2019

(54) FILTER APPARATUS

(71) Applicant: YAMASHIN-FILTER CORP., Kanagawa (JP)

(72) Inventors: Mitsunobu Okamoto, Kanagawa (JP); Makoto Ishizuka, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 254 days.

(21) Appl. No.: 15/598,553

(22) Filed: May 18, 2017

(65) Prior Publication Data
US 2017/0340992 A1    Nov. 30, 2017

(30) Foreign Application Priority Data

May 27, 2016 (JP) .................................. 2016-106450
Apr. 14, 2017 (JP) .................................. 2017-080669

(51) Int. Cl.
| | | |
|---|---|---|
| *B01D 19/00* | (2006.01) | |
| *B01D 35/027* | (2006.01) | |
| *B01D 29/11* | (2006.01) | |
| *B01D 29/90* | (2006.01) | |
| *B01D 29/92* | (2006.01) | |

(52) U.S. Cl.
CPC ..... *B01D 19/0057* (2013.01); *B01D 19/0031* (2013.01); *B01D 29/114* (2013.01); *B01D 29/908* (2013.01); *B01D 29/925* (2013.01); *B01D 35/0276* (2013.01)

(58) Field of Classification Search
CPC .............. B01D 29/908; B01D 19/0057; B01D 19/0031; B01D 29/114; B01D 35/0276; B01D 36/001; B01D 36/045; B91D 29/925

See application file for complete search history.

(56) References Cited

U.S. PATENT DOCUMENTS

| | | | | | |
|---|---|---|---|---|---|
| 4,865,632 | A | * | 9/1989 | Yano ................... | B01D 19/0057 96/212 |
| 4,878,924 | A | * | 11/1989 | Yano ................... | B01D 19/0057 96/212 |
| 4,997,556 | A | * | 3/1991 | Yano ..................... | B01D 27/144 184/6.24 |
| 5,632,894 | A | * | 5/1997 | White .................. | A61M 1/3627 210/436 |
| 6,176,904 | B1 | * | 1/2001 | Gupta ................. | A61M 1/3627 210/188 |
| 2009/0056553 | A1 | * | 3/2009 | Konishi ............. | B01D 19/0031 96/206 |
| 2018/0104629 | A1 | * | 4/2018 | Taku .......................... | F15B 1/26 |
| 2018/0229157 | A1 | * | 8/2018 | Oshita .................... | B01D 24/38 |
| 2018/0229162 | A1 | * | 8/2018 | Oshita .................. | B01D 35/147 |

FOREIGN PATENT DOCUMENTS

JP       2004-011873 A       1/2004

* cited by examiner

*Primary Examiner* — Robert Clemente
(74) *Attorney, Agent, or Firm* — Nakamishi IP Associates, LLC (57) ABSTRACT

A liquid is made to flow into a filter case from a tangential direction at any point on a side surface of the filter case and produces a swirling flow. Bubbles collected in a center of the swirling flow are retained by a retainer plate, thereby removing the bubbles from the liquid. A filter element filters the liquid from which the bubbles were removed.

3 Claims, 10 Drawing Sheets

FILTER APPARATUS

TECHNICAL FIELD

The present invention relates to a filter apparatus.

BACKGROUND ART

Patent Document 1 discloses a method of housing a cyclone-type bubble removing device in a lower end side of a filter, and briskly discharging hydraulic oil upon removal of bubbles by the bubble removing device from a lower portion side of a cyclone chamber into a hydraulic oil tank.

CITATION LIST

Patent Literature

Patent Document 1: Japanese Unexamined Patent Application Publication No. 2004-11873A Nevertheless, in the invention described in Patent Document 1, the bubbles removed by the bubble removing device are released into the interior of the hydraulic oil tank (liquid tank), thus the bubbles may be suctioned from the strainer and fed into the pump.

The present invention was made in view of such circumstances, and therefore an object of the present invention is to provide a filter apparatus capable of removing bubbles contained in a liquid, and ensuring that the removed bubbles are not released inside a liquid tank.

SUMMARY OF INVENTION

A filter apparatus according to an aspect of the present invention includes, for example, a bubble removing portion including a filter case having a bottomed substantially cylindrical shape, an inflow pipe that is provided to a side surface of the filter case, is configured to cause a liquid to flow into the filter case from a tangential direction at any point on the side surface of the filter case, and produce a swirling flow in the liquid that flowed thereto, and a retainer plate that is provided to an interior of the filter case and is configured to retain bubbles collected in a center of the swirling flow by the swirling flow, the bubble removing portion, positioned on an upper side of the inflow pipe in a height direction, a filter element that is provided to the interior of the filter case and includes a filtration material that is configured to filter the liquid that passes through the bubble removing portion, and an outflow pipe that has a substantially cylindrical shape and communicates with a hollow portion of the filter element.

The filter apparatus according to an aspect of the present invention is configured to make the liquid to flow into the filter case from the tangential direction at any point on the side surface of the filter case to produce a swirling flow, the retainer plate is configured to retain the bubbles collected in the center of the swirling flow to remove the bubbles from the liquid, and the filter element is configured to filter the liquid from which the bubbles were removed. Thus, the bubbles contained in the liquid may be removed. Further, the bubbles do not pass through the filter element. Thus, the removed bubbles may not be released inside the liquid tank.

Here, the inflow pipe may be provided in a neighborhood of a bottom surface of the filter case, and the retainer plate may be provided to a lower side of the filter element. Thus, the bubbles along the flow of the liquid may be removed.

Here, the filter element may be provided in a neighborhood of the bottom surface of the filter case, and a position of the inflow pipe in the height direction may be between the retainer plate and the filter element. Thus, the bubbles may be less likely to pass through the filter element.

Here, the filter element may include an upper plate that covers an upper end surface of the filtration material, and a lower plate that covers a lower end surface of the filtration material and is the retainer plate. The lower plate also is the retainer plate as such. Thus, the number of parts may be reduced and a simpler configuration may be created.

Here, a diameter of the retainer plate may be greater than a diameter of the filtration material. Thus, the bubbles that floated upward may not flow toward the filter element.

According to an aspect of the present invention, bubbles contained in a liquid may be removed and the removed bubbles may not be released inside a liquid tank.

DESCRIPTION OF EMBODIMENTS

Below, detailed description will be given according to embodiments of the present invention with reference to the drawings. While a filter apparatus according to the present invention is described below using a return filter provided to an interior of a liquid tank as an example, the present invention can be applied to various filter apparatuses other than the return filter. Further, the filter apparatus according to the present invention is capable of filtering various liquids other than hydraulic oil.

First Embodiment

Figure 1:
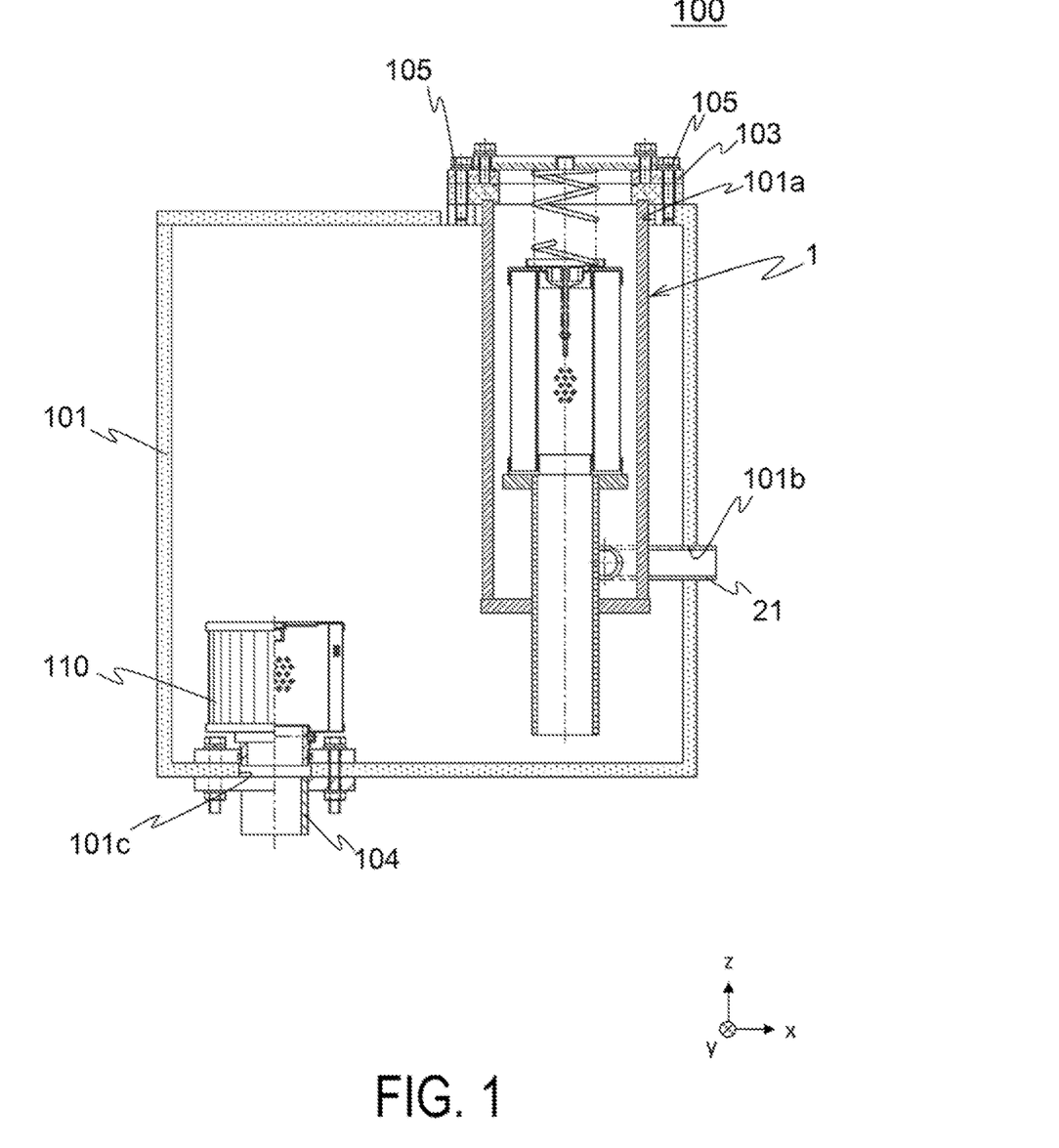
FIG. 1 is a diagram illustrating an overview of a hydraulic oil tank 100 provided with a return filter 1, according to an embodiment of the present invention, in the interior thereof.

FIG. 1 is a diagram illustrating an overview of a hydraulic oil tank 100 provided with a return filter 1, according to an embodiment of the present invention, in the interior thereof. In FIG. 1, main parts of the hydraulic oil tank 100 are illustrated from a perspective view.

The hydraulic oil tank 100 is installed in a work machine (a hydraulic apparatus, for example, not illustrated), and is a tank provided inside a hydraulic circuit of a hydraulic oil supplied to the hydraulic apparatus for storing the hydraulic oil. In the hydraulic circuit, the hydraulic oil passes through the hydraulic apparatus and is configured to be introduced into the hydraulic oil tank 100. The hydraulic oil tank 100 is contained in a liquid tank.

The hydraulic oil tank 100 includes a tank main body 101 having a box shape, for example, and this tank main body 101 has a hollow interior. Inside the tank main body 101 are mainly provided the return filter 1 and a suction strainer 110.

An opening 101a used for maintenance of the return filter 1 and the like is formed on an upper surface of the tank main body 101. The return filter 1 is attached to the opening 101a. Further, a lid body 103 is attached to the opening 101a. Bolt insertion holes are formed in a peripheral edge portion of the lid body 103. Bolts 105 inserted through the bolt insertion holes are screwed into bolt holes of the tank main body 101, thereby tightening the lid body 103 to the tank main body 101.

Further, an air breather (not illustrated) that is configured to filter the air that enters the tank main body 101 in association with the vertical movement of the oil surface, and not allow refuse or the like to enter the hydraulic oil, is provided to the upper surface of the tank main body 101.

An inflow port 101b that is configured to allow the hydraulic oil to flow into the interior of the tank main body 101 is formed on a side surface of the tank main body 101. An inflow pipe 21 (described later) of the return filter 1 is fitted into the inflow port 101b. The hydraulic oil introduced into the return filter 1 via the inflow pipe 21 is configured to be filtered by the return filter 1 and stored in the hydraulic oil tank 100.

An outflow port 101c that allows the hydraulic oil inside the tank main body 101 to flow out to a hydraulic pump (not illustrated) is formed in a neighborhood of a lower end portion of the tank main body 101 (on a bottom surface of the tank main body 101 according to the present embodiment). A suction pipe 104 that leads to a suction port of the hydraulic pump (not illustrated) is fitted into the outflow port 101c.

To prevent foreign matter from entering the suction pipe 104, the suction strainer 110 is provided on an upper side of the outflow port 101c (inner side of the tank main body 101). The hydraulic oil stored in the hydraulic oil tank 100 is suctioned into the hydraulic pump (not illustrated), flows out to the suction pipe 104 via the suction strainer 110, and is supplied once again to the hydraulic apparatus.

Figure 2:
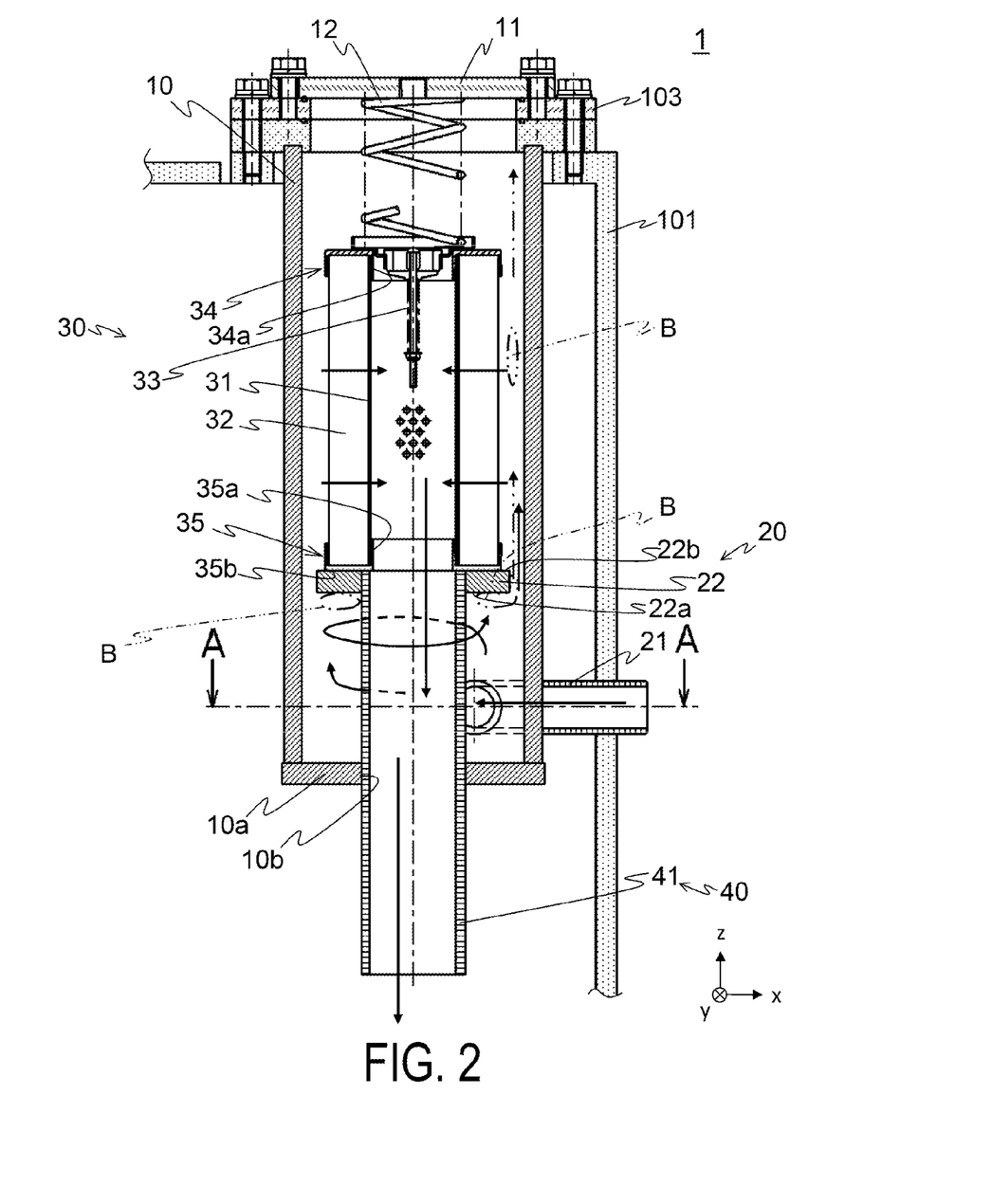
FIG. 2 is a cross-sectional view illustrating an overview of the return filter 1.

FIG. 2 is a cross-sectional view illustrating an overview of the return filter 1. The return filter 1 mainly includes a filter case 10, a bubble removing portion 20, a filter element 30, and an outflow portion 40.

The filter case 10 is a member having a bottomed substantially cylindrical shape, and is formed from a material having high corrosion resistance (a metal such as stainless steel, or a resin, for example). A lid 11 is provided to the filter case 10 so as to cover an upper end thereof.

The bubble removing portion 20 mainly includes the inflow pipe 21 that is provided to a side surface of the filter case 10 and is configured to introduce oil into the internal space of the filter case 10, and a retainer plate 22 provided to the interior of the filter case.

Figure 3:
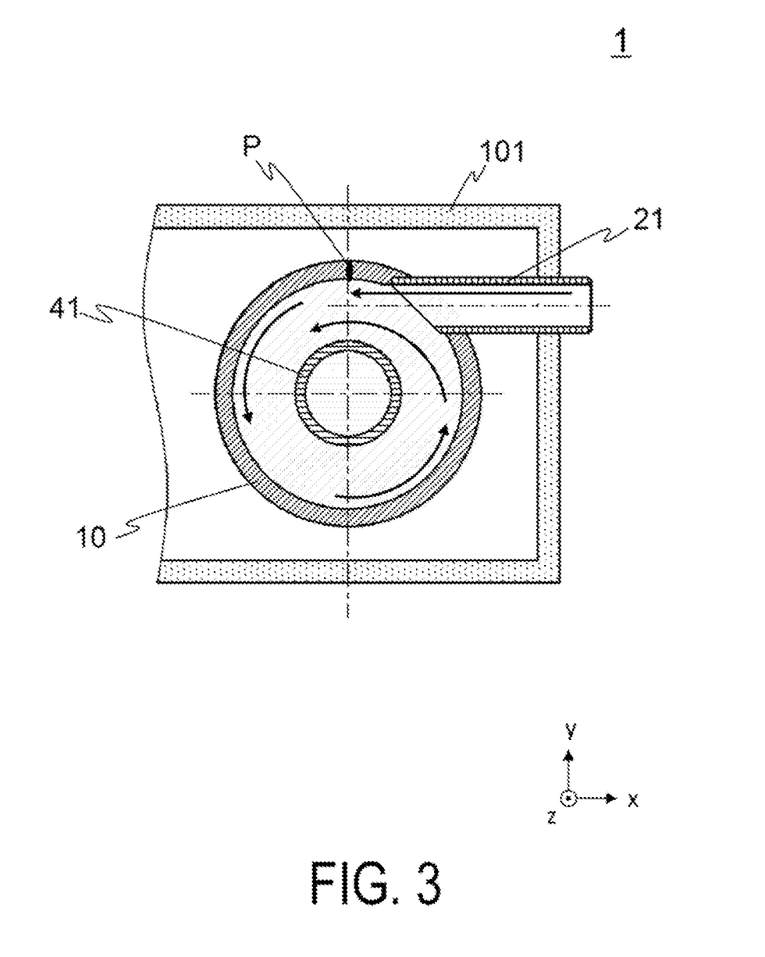
FIG. 3 is a cross-sectional view along A-A in FIG. 2.

FIG. 3 is a cross-sectional view along A-A in FIG. 2. The inflow pipe 21 is configured to allow oil to flow into the interior of the filter case 10 from a tangential direction at any point P on the side surface of the filter case 10. As a result, the hydraulic oil that entered from the inflow pipe 21 is configured to swirl in the interior of the filter case 10, as illustrated by the arrows in FIG. 3. The inflow pipe 21 is provided substantially along a tangent at any point P of the filter case 10, configured to cause the hydraulic oil to flow while gradually swirling from an outer periphery to an inner side of the filter case 10. When a swirling flow is thus produced in the hydraulic oil, the bubbles contained in the hydraulic oil are configured to be collected in a center portion of the swirling flow.

Note that "substantially along a tangent" is not limited to being strictly along a tangent, and is a concept that includes, for example, cases where the position of the inflow pipe 21 is shifted by small amount (about a few mm, for example) with respect to the tangent regarded as equivalent to "along a tangent," and cases where a center line of the inflow pipe 21 is shifted by a few degrees with respect to the tangent. The case illustrated in FIG. 3 is also included in "substantially along a tangent."

The description will now return to FIG. 2. The retainer plate 22 is a plate-shaped member made from a metal or a resin, for example, and is configured to retain the bubbles collected in the center of the swirling flow. The retainer plate 22 is positioned on an upper side of the inflow pipe 21 in the height direction and on a lower side (−z side) of the filter element 30. That is, the position of the retainer plate 22 in the height direction is between the inflow pipe 21 and the filter element 30. A through-hole 22a into which an outflow pipe 41 is inserted is formed at the substantial center of the retainer plate 22. Note that the retainer plate 22 and the outflow pipe 41 may be integrally formed.

The inflow pipe 21 is provided in a neighborhood of a bottom surface 10a of the filter case 10. Thus, the hydraulic oil that enters from the inflow pipe 21 flows upward (in the +z direction) while swirling, as illustrated by the arrows in FIG. 2. With this, the bubbles collected in the center portion of the swirling flow also float upward and are configured to be retained by the retainer plate 22.

The filter element 30 is a member having a substantially cylindrical shape provided to the interior of the filter case 10. The filter element 30 mainly includes an inner tube 31, a filtration material 32, a valve 33, and plates 34, 35.

The inner tube 31 and the filtration material 32 are members that have substantially hollow cylindrical shapes and include openings at both ends. The inner tube 31 is formed using a material having high corrosion resistance (a metal such as stainless steel or a resin, for example), and holes through which the hydraulic oil passes are formed substantially across the entire region thereof.

The filtration material 32 is configured to filter the hydraulic oil that has passed through the bubble removing portion 20, and has a substantially cylindrical shape with a thickness in a radial direction. The height of the filtration material 32 is substantially the same as the height of the inner tube 31. The filtration material 32 is formed by pleating a filter paper based on a synthetic resin, paper, or the like, and connecting both ends of the pleated filter paper to form a cylindrical shape.

The plate 34 is provided to first ends of the inner tube 31 and the filtration material 32, and the plate 35 is provided to second ends. The plate 34 and the plate 35 are members having a substantially circular plate shape or a bottomed substantially cylindrical shape, and are formed using a resin or a metal.

The plate 34 and the plate 35 are provided so as to cover the ends (openings) of the inner tube 31 and the filtration material 32. In other words, the plate 34 and the plate 35 sandwich the inner tube 31 and the filtration material 32.

The plate 34 covers the upper ends of the inner tube 31 and the filtration material 32. An inner peripheral surface 34a of the plate 34 is inserted into an inner peripheral surface of the inner tube 31.

The valve 33 is provided to the plate 34. The valve 33 is configured to open and close in accordance with a difference between a pressure between the filter case 10 and the filter element 30 (on the outer side of the filter element 30), and a pressure on the inner side of the filter element 30.

The plate 35 covers the lower ends of the inner tube 31 and the filtration material 32. An inner peripheral tube 35a of the plate 35 is inserted into the inner peripheral surface of the inner tube 31. Further, a lower surface 35b of the plate 35 comes into contact with an upper surface 22b of the retainer plate 22.

An elastic member 12 is provided between the plate 34 and the lid 11. The elastic member 12 is a coil spring, for example, and presses the plate 34, that is, the filter element 30, downward (in the −z direction). As a result, the filter element 30 is provided to the interior of the filter case 10 by the lid 11 and the retainer plate 22.

The outflow portion 40 includes the outflow pipe 41 that has a substantially cylindrical shape and communicates with a hollow portion of the filter element 30. The outflow pipe 41 is inserted into a through-hole 10b formed in the bottom surface 10a of the filter case 10, and is inserted into the through-hole 22a formed in the retainer plate 22. The upper surface 22b of the retainer plate 22 comes into contact with the lower surface 35b of the plate 35, and thus the hollow portion of the outflow pipe 41 communicates with the hollow portion of the filter element 30 (the hollow portion of the inner tube 31). Note that the area between the upper surface 22b and the lower surface 35b is sealed by a sealing member such as a gasket.

Next, the function of the return filter 1 thus configured will be described. The arrows in FIG. 2 indicate the flow of the hydraulic oil in the interior of the return filter 1.

The hydraulic oil that entered from the inflow pipe 21 flows into the interior of the filter case 10. The entered hydraulic oil is configured to flow upward while swirling. A swirling flow is produced in the hydraulic oil, causing the small bubbles contained in the hydraulic oil to collect in the center portion of the swirling flow and become large bubbles B, and the bubbles B are configured to be retained by the retainer plate 22. Thus, the bubbles contained in the hydraulic oil are configured to be removed by the bubble removing portion 20. The hydraulic oil flows from the bottom to the top. Thus, the bubbles along the flow of the hydraulic oil may be removed.

The hydraulic oil from which the bubbles were removed flows further upward and into the space between the filter case 10 and the filter element 30. The hydraulic oil flows from the outer side to the inner side of the filter element 30 and, the filtered hydraulic oil flows out to the inner side of the inner tube 31. The filtered hydraulic oil flows downward from the inner side of the inner tube 31, and out from the outflow pipe 41 to inside the hydraulic oil tank 100.

When the bubbles B retained by the retainer plate 22 grow in size, the bubbles B can no longer be fully retained by the retainer plate 22. The bubbles B that grew in size float upward from the peripheral edge of the retainer plate 22, as indicated by the chain double-dashed line arrows in FIG. 2. The diameter of the retainer plate 22 is greater than the diameter of the filter element 30 (that is, the filtration material 32), and thus the bubbles B that floated upward accumulate in the interior of the return filter 1 (the lower side of the lid 11) without flowing to the filter element 30, and never enter the interior of the hydraulic oil tank 100.

According to the present embodiment, the bubbles contained in the hydraulic oil can be removed by the return filter 1. Thus, defects may be prevented that occur as a result of air being suctioned into the pump. The bubbles may also be prevented from bursting inside the hydraulic circuit or the like, which causes the temperature and the pressure of the hydraulic oil to temporarily increase to a significant degree and, as a result, the occurrence of part damage and the like.

Modification 1 of First Embodiment

Figure 4:
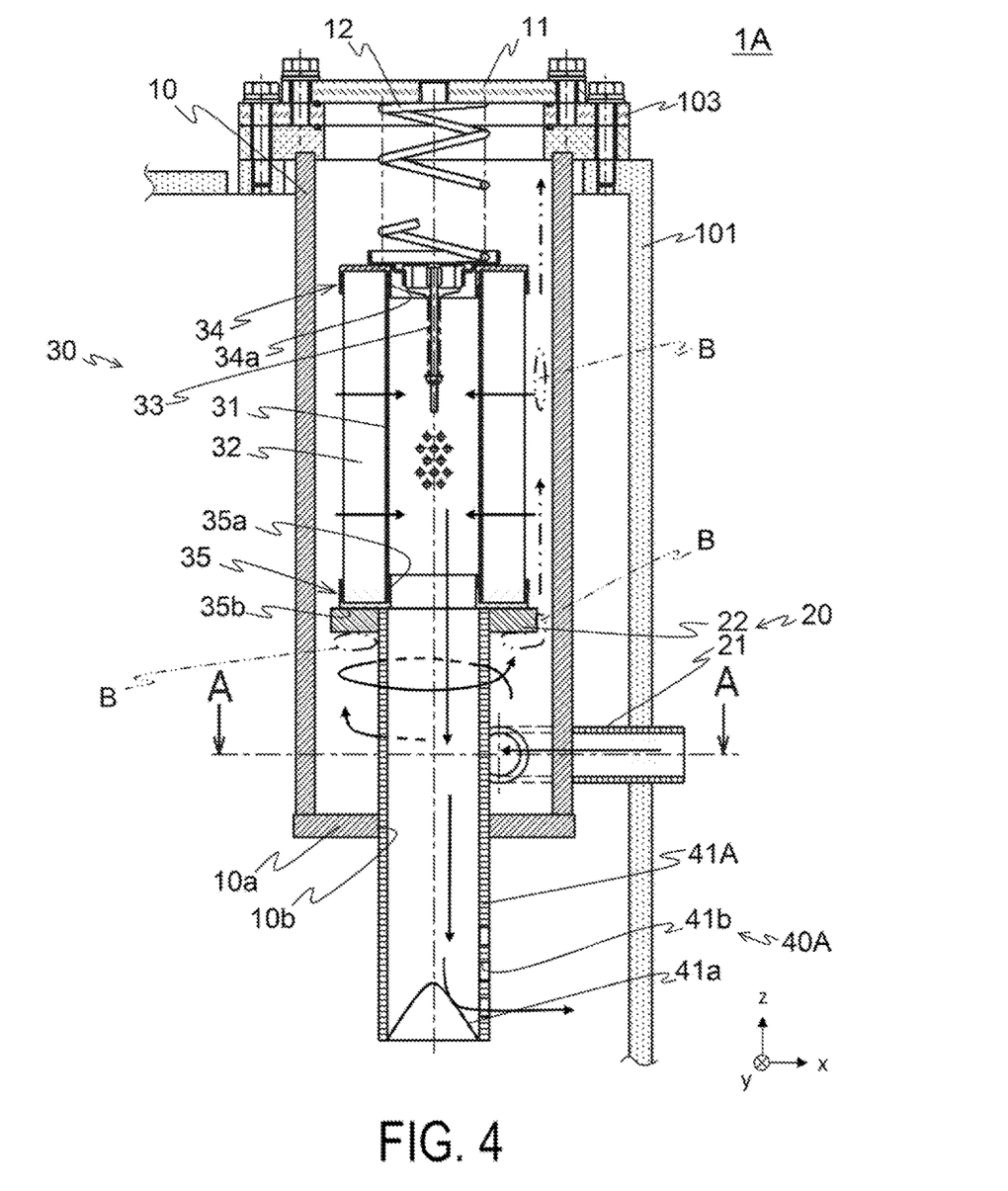
FIG. 4 is a cross-sectional view illustrating an overview of a return filter 1A according to a modification 1 of the first embodiment.

While the filtered hydraulic oil flows out downward from the outflow pipe 41 and into the hydraulic oil tank 100 according the first embodiment, the filtered hydraulic oil may flow out sideways. FIG. 4 is a cross-sectional view illustrating an overview of a return filter 1A according to a modification 1 of the first embodiment. Note that the same components as those in the first embodiment are denoted using the same reference numerals, and descriptions thereof will be omitted.

A lower end of an outflow pipe 41A is covered by a lower end surface 41a having a substantially truncated cone shape that increases in height and decreases in width toward the center. A plurality of holes 41b are formed in a side surface of the outflow pipe (specifically, in a neighborhood of the lower end surface 41a). As a result, the hydraulic oil that flowed downward through the interior of the outflow pipe 41 come into contact with the lower end surface 41a, thereby changing the flow to a direction (the +x direction here) substantially orthogonal to the z direction and thus causing the hydraulic oil to flow out from the holes 41b and into the tank main body 101. Further, the holes 41b are provided only on the side opposite to the suction strainer 110. Thus, the bubbles may be made less likely to be suctioned by the suction strainer 110 even when the bubbles contained in the hydraulic oil are not fully removed by the bubble removing portion 20.

Modification 2 of First Embodiment

Figure 5:
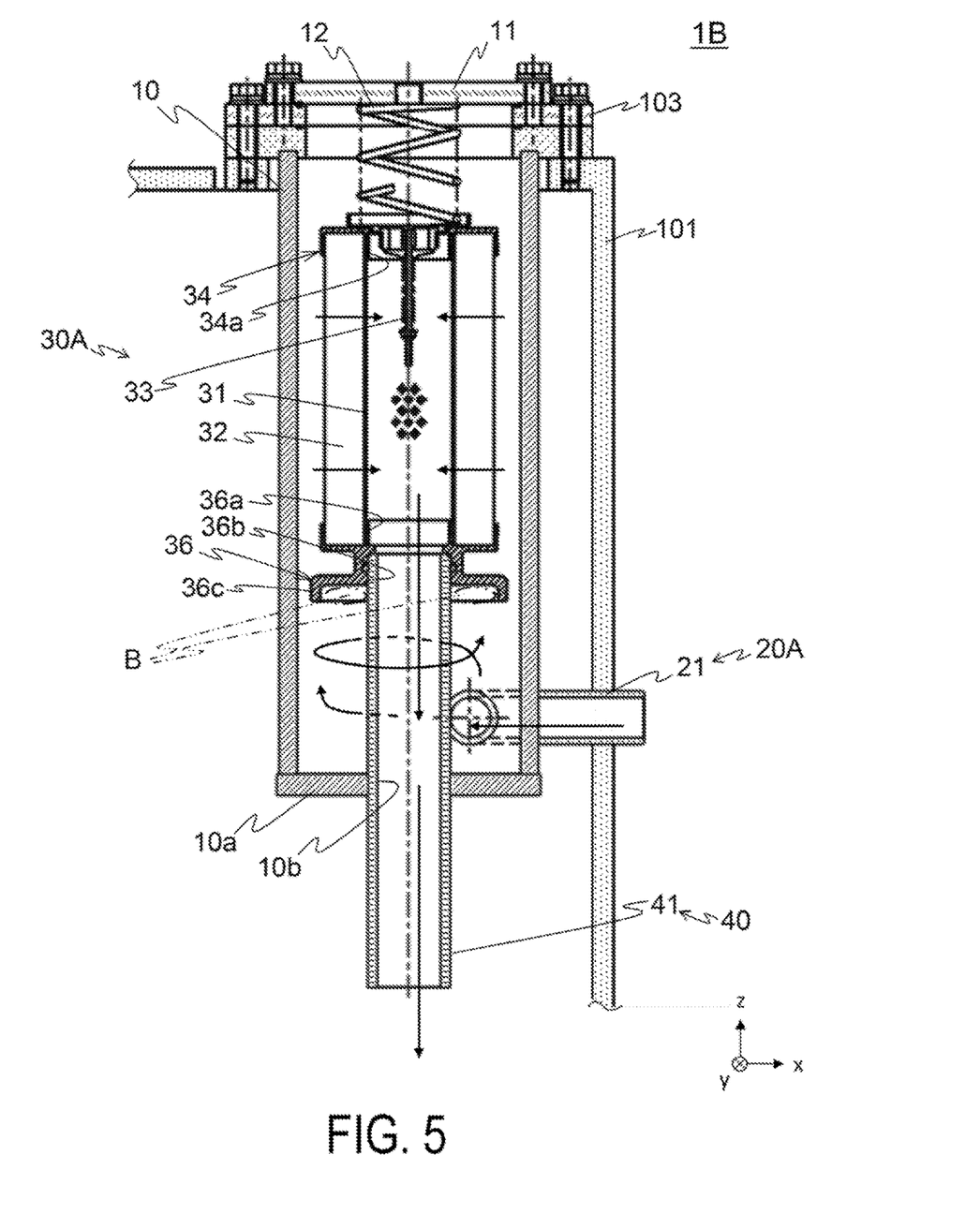
FIG. 5 is a cross-sectional view illustrating an overview of a return filter 1B according to a modification 2 of the first embodiment.

While the filter element 30 and the retainer plate 22 are separately provided according to the first embodiment, a plate of the filter element may also be the retainer plate. FIG. 5 is a cross-sectional view illustrating an overview of a return filter 1B according to a modification 2 of the first embodiment. Note that the same components as those in the first embodiment are denoted using the same reference numerals, and descriptions thereof will be omitted.

The return filter 1B mainly includes the filter case 10, a bubble removing portion 20A, a filter element 30A, and the outflow portion 40. The filter element 30A mainly includes the inner tube 31, the filtration material 32, the valve 33, and plates 34, 36.

The plate 36 covers the lower ends of the inner tube 31 and the filtration material 32. The plate 36 includes a first tube 36a inserted into the inner peripheral surface of the inner tube 31, and a second tube 36b into which the outflow pipe 41 is inserted. Further, the plate 36 further includes a retainer plate 36c on a tip of the second tube 36b. The retainer plate 36c has a substantially plate-like shape and is a retainer plate that is configured to retain the bubbles B. The bubble removing portion 20A includes this retainer plate 36c and the inflow pipe 21. The retainer plate 36c is positioned on the upper side of the inflow pipe 21 in the height direction.

To ensure that the filter element 30A does not suction the bubbles B, a diameter of the retainer plate 36c is preferably greater than a diameter of the filter element 30A (that is, the filtration material 32).

The retainer plate 36c is a portion of the plate 36. Thus, the number of parts may be reduced and a simpler configuration may be created. Further, the retainer plate 36c has a substantially channel-shaped cross section. Thus, a greater number of bubbles may be retained.

Modification 3 of First Embodiment

Figure 6:
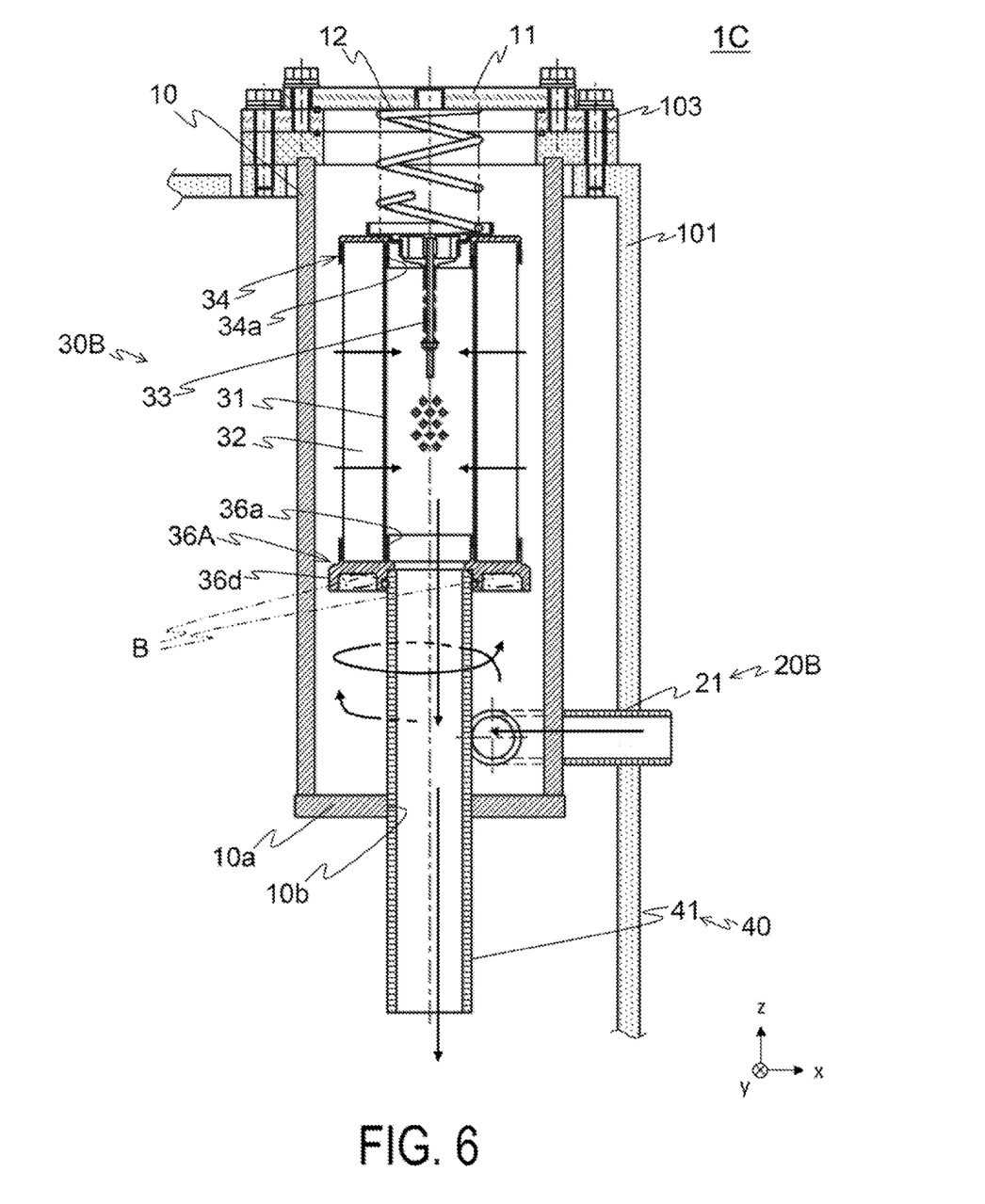
FIG. 6 is a cross-sectional view illustrating an overview of a return filter 1C according to a modification 3 of the first embodiment.

FIG. 6 is a cross-sectional view illustrating an overview of a return filter 1C according to a modification 3 of the first embodiment. The difference between the return filter 1B and the return filter 1C is the shape of the plate. A filter element 30B mainly includes the inner tube 31, the filtration material 32, the valve 33, and plates 34, 36A. The plate 36A includes the first tube 36a inserted into the inner peripheral surface of the inner tube 31, and a retainer plate 36d that has a substantially plate-like shape is a retainer plate that is configured to retain the bubbles B. A bubble removing portion 20B includes this retainer plate 36d and the inflow pipe 21.

Second Embodiment

While the inflow pipe 21 is provided in a neighborhood of the bottom surface 10a of the filter case 10 and the retainer plate 22 is provided on the lower side of the filter element 30 according the first embodiment, that is, the bubble removing portion 20 is provided on the lower side of the filter element 30, the position of the bubble removing portion is not limited thereto.

Figure 7:
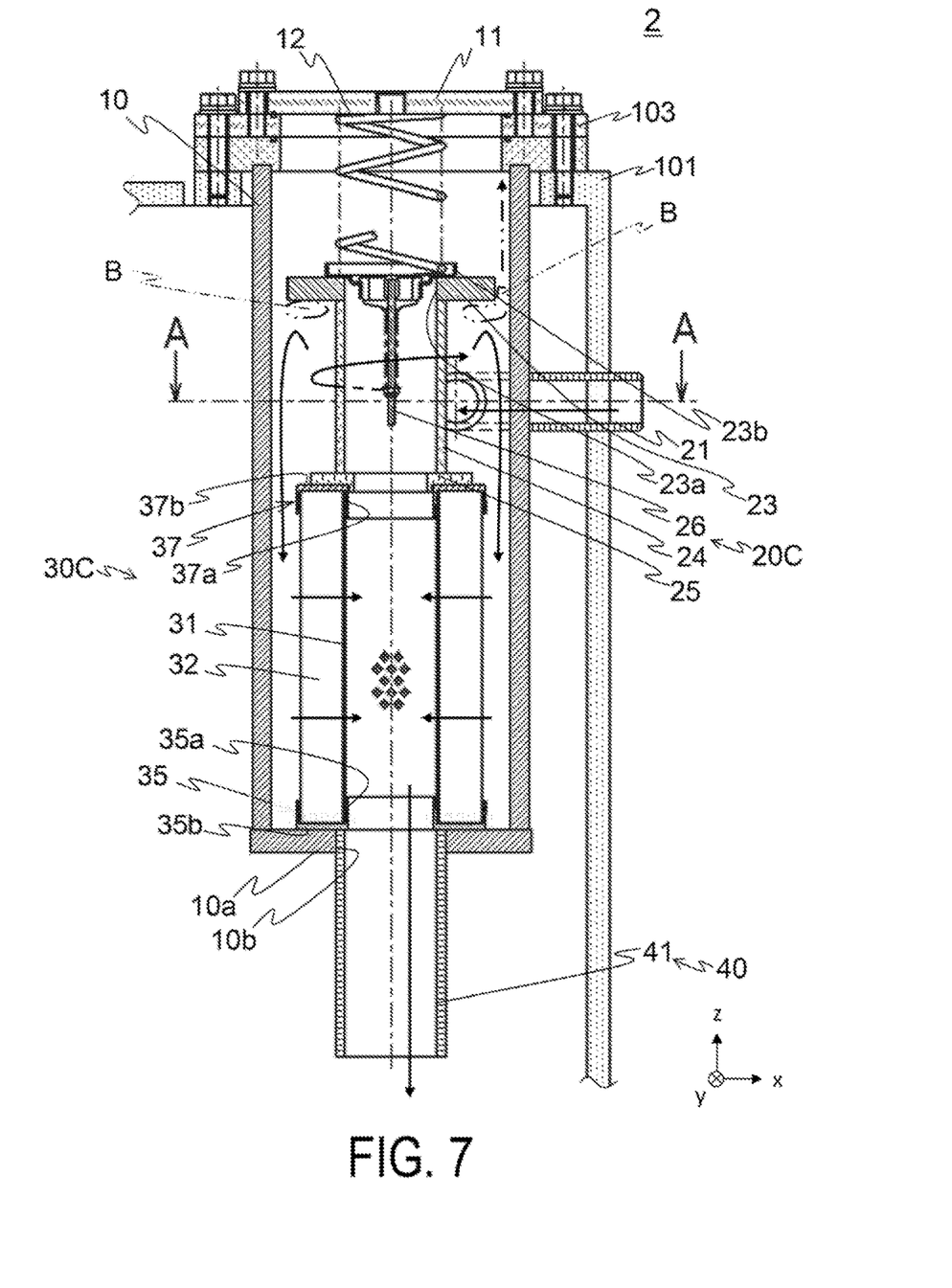
FIG. 7 is a cross-sectional view illustrating an overview of a return filter 2 according to a second embodiment.

According to a second embodiment, the bubble removing portion is provided to the upper side (+z side) of the filter element. FIG. 7 is a cross-sectional view illustrating an overview of a return filter 2 according to the second embodiment. Note that the same components as those in the first embodiment are denoted using the same reference numerals, and descriptions thereof will be omitted.

The return filter 2 mainly includes the filter case 10, a bubble removing portion 20C, a filter element 30C, and the outflow portion 40. The filter element 30C mainly includes the inner tube 31, the filtration material 32, and plates 35, 37.

The bottom surface 35b of the plate 35 comes into contact with the bottom surface 10a of the filter case 10. That is, the filter element 30C is provided in a neighborhood of the bottom surface 10a of the filter case 10. However, the lower surface 35b and the bottom surface 10a may be separated by a small distance and sealed with a sealing member or the like.

The plate 37 covers the upper ends of the inner tube 31 and the filtration material 32. An inner peripheral surface 37a of the plate 37 is inserted into the inner peripheral surface of the inner tube 31. The bubble removing portion 20C is provided to an upper surface 37b of the plate 37.

The bubble removing portion 20C mainly includes the inflow pipe 21, a retainer plate 23, a tube portion 24, and attachment plate 25, and a valve 26. The retainer plate 23, the tube portion 24, and the attachment plate 25 are provided to the interior of the filter case 10.

The inflow pipe 21 is positioned on the upper side (+z side) of the filter element 30. Further, the retainer plate 23 is positioned on the upper side of the inflow pipe 21. In other words, the position of the inflow pipe 21 in the height direction is between the filter element 30C and the retainer plate 23.

The retainer plate 23 is a plate-shaped member made from a metal or a resin, for example, and is configured to retain the bubbles collected in the center of the swirling flow. A through-hole 23a is formed at the substantial center of the retainer plate 23, and a plate 23b is provided so as to cover an end surface on an upper side of the through-hole 23a.

The tube portion 24 is provided on a lower side of the retainer plate 23 so as to cover the through-hole 23a. The attachment plate 25 is provided on a lower side of the tube portion 24. The attachment plate 25 is attached to the upper surface 37b and the inner peripheral surface 37a of the plate 37, and thus the bubble removing portion 20C is provided to an upper side of the filter element 30C.

The valve 26 is provided to the plate 23b. The valve 26 is provided to the interior of the tube portion 24, and is configured to open and close in accordance with a difference between a pressure between the filter case 10 and the filter element 30C (on the outer side of the filter element 30C), and a pressure on the inner side of the filter element 30C.

The elastic member 12 is provided between the plate 23b and the lid 11. The elastic member 12 presses the plate 23b, that is, the bubble removing portion 20C and the filter element 30C, downward. As a result, the bubble removing portion 20C and the filter element 30C are provided to the interior of the filter case 10.

Figure 8:
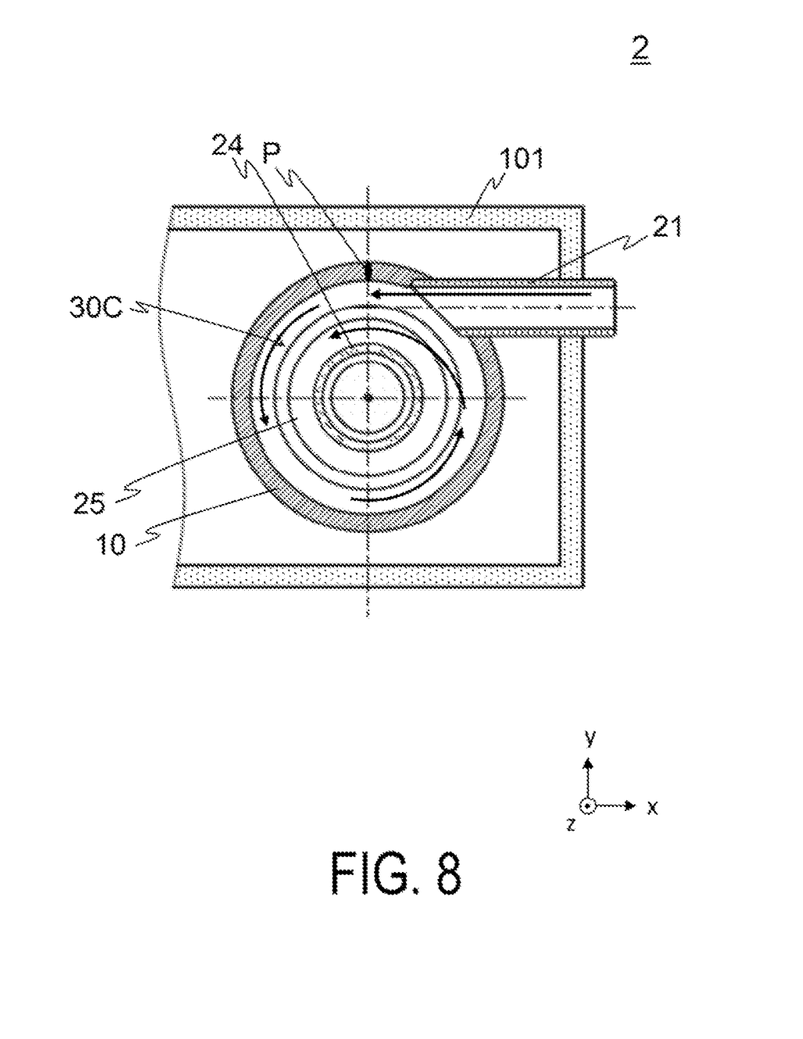
FIG. 8 is a cross-sectional view along A-A in FIG. 7.

FIG. 8 is a cross-sectional view along A-A in FIG. 7. The inflow pipe 21 is configured to allow oil to flow into the space inside the interior of the filter case 10 and outside the tube portion 24 from the tangential direction at any point P on the filter case 10. As a result, the hydraulic oil that entered from the inflow pipe 21 swirls, as illustrated by the arrows in FIG. 8.

The description will now return to FIG. 7. The hydraulic oil that entered from the inflow pipe 21 contains bubbles, and thus flows upward while swirling. During this period, the bubbles contained in the hydraulic oil collect in the center portion of the swirling flow, and grow to the large bubbles B. The grown bubbles B move upward by buoyancy, and are configured to be retained by the retainer plate 23. When the bubbles B cannot be fully retained by the retainer plate 23, the bubbles B float upward from a peripheral edge of the retainer plate 23, as indicated by the chain double-dashed line arrow in FIG. 7. The bubbles B accumulate in the interior of the filter case 10 and on the lower side of the lid 11, never entering the interior of the hydraulic oil tank 100.

The hydraulic oil from which the bubbles were removed flows downward and into the space between the filter case 10 and the filter element 30C. With the orientations of the flow of the hydraulic oil and the flow of the bubbles B differing, the bubbles B are less likely to pass through the filter element. The hydraulic oil that flowed downward flows from the outer side to the inner side of the filter element 30C and, the filtered hydraulic oil, flows out to the inner side of the inner tube 31. The filtered hydraulic oil flows downward from the inner side of the inner tube 31, and out from the outflow pipe 41 to inside the hydraulic oil tank 100.

According to the present embodiment, the bubbles contained in the hydraulic oil may be removed by the return filter 2, and the removed bubbles may not flow inside the hydraulic oil tank 100.

Modification 1 of Second Embodiment

Figure 9:
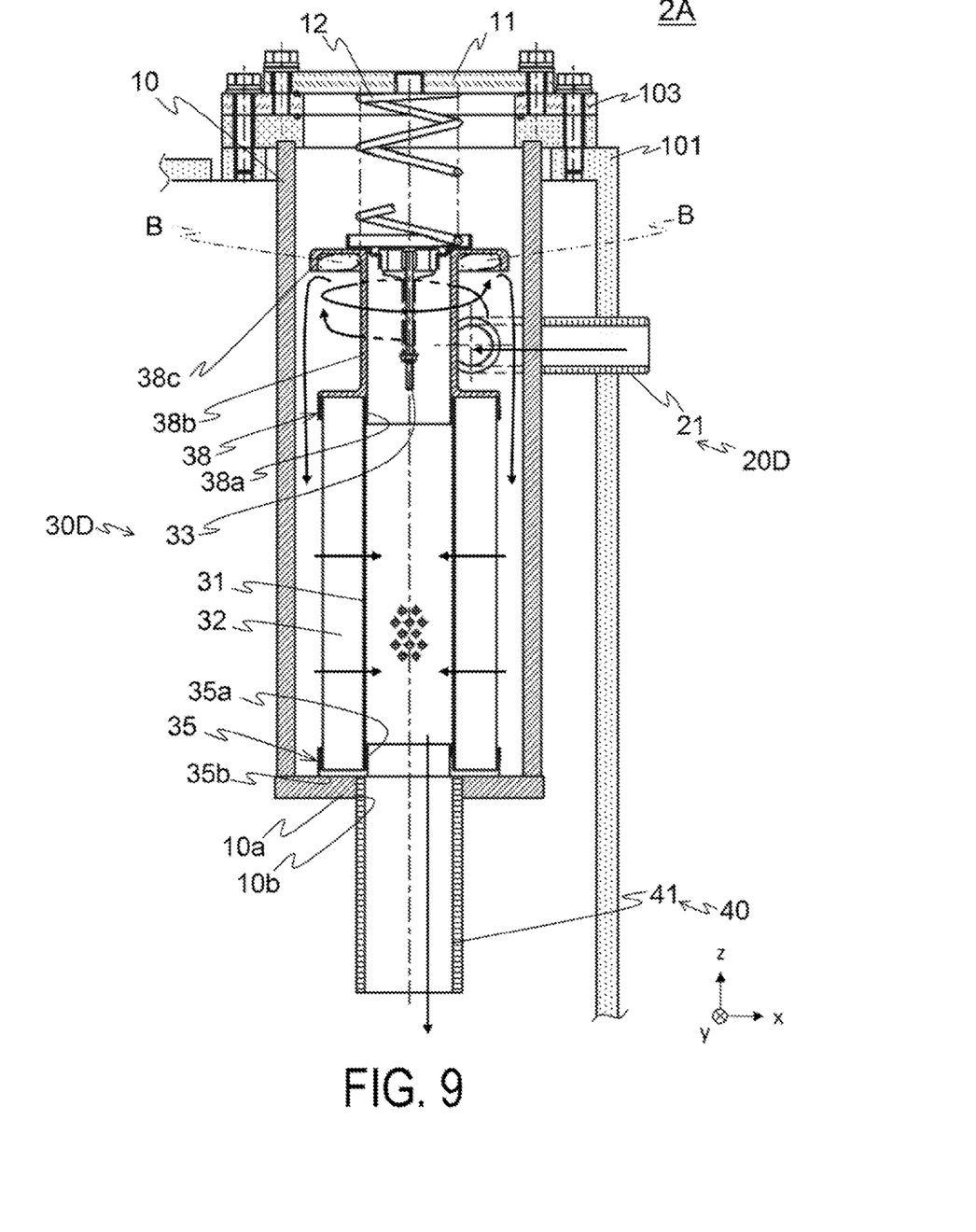
FIG. 9 is a cross-sectional view illustrating an overview of a return filter 2A according to a modification 1 of the second embodiment.

While the filter element 30C and the retainer plate 23 are separately provided according to the second embodiment, a plate of the filter element may be the retainer plate. FIG. 9 is a cross-sectional view illustrating an overview of a return filter 2A according to a modification 1 of the second embodiment. Note that the same components as those in the second embodiment are denoted using the same reference numerals, and descriptions thereof will be omitted.

The return filter 2A mainly includes the filter case 10, a bubble removing portion 20D, a filter element 30D, and the outflow portion 40. The filter element 30D mainly includes the inner tube 31, the filtration material 32, the valve 33, and plates 35, 38.

The plate 38 covers the upper ends of the inner tube 31 and the filtration material 32. The plate 38 includes a first tube 38a inserted into the inner peripheral surface of the inner tube 31, and a second tube 38b that protrudes upward. Further, a retainer plate 38c that has a substantially plate-like shape that is a retainer plate configured to retain the bubbles B is formed on a tip of the second tube 38b. The bubble removing portion 20D includes this retainer plate 38c and the inflow pipe 21.

The retainer plate 38c is positioned on the upper side of the inflow pipe 21. Further, the inflow pipe 21 is provided between the first tube 38a and the retainer plate 38c in the height direction. Thus, the bubbles B move upward by buoyancy, and are configured to be retained by the retainer plate 38c.

The retainer plate 38c is integrated with the plate 38. Thus, the number of parts may be reduced and a simpler configuration may be created. Further, the retainer plate 38c has a substantially channel-shaped cross section. Thus, a greater number of bubbles B may be retained.

Note that while the bubbles B accumulate in the interior of the filter case 10 and on the lower side of the lid 11 according to the embodiment described above, an air-bleed valve or the like may be provided to the lid 11, and the air accumulated in the interior of the filter case 10 and on the lower side of the lid 11 may be released outside the filter case 10 (outside the hydraulic oil tank 100).

Figure 10:
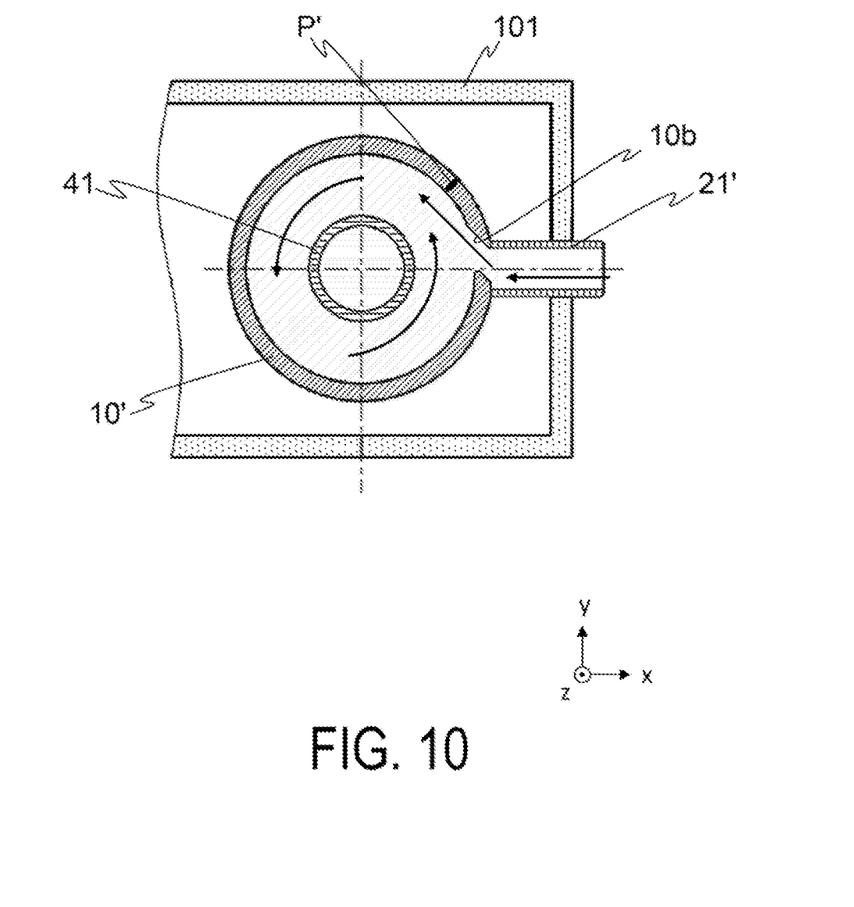
FIG. 10 is a diagram schematically illustrating a modification in which a swirling flow is produced in a hydraulic oil in an interior of a filter case 10'.

Further, while according to the embodiment described above the oil is made to flow into the interior of the filter case 10 from the tangential direction at the point P, producing a swirling flow in the hydraulic oil, the method for producing a swirling flow in the hydraulic oil is not limited thereto. FIG. 10 is a diagram schematically illustrating a modification in which a swirling flow is produced in the hydraulic oil in an interior of a filter case 10'. In FIG. 10, a center of the filter case 10' is positioned on an extending line of an inflow pipe 21', and the inflow pipe 21' is not provided substantially along the tangent at any point P' of the filter case 10. The opening 10b that communicates with the interior of the filter case 10' and the interior of the inflow pipe 21' is formed in the filter case 10'. A wall surface of the opening 10b runs substantially along the tangent at a point P'. Thus, the hydraulic oil passes through the opening 10b, thereby flowing into the interior of the filter case 10' from a tangential direction at the point P'. Further, a flow path surface area of the opening 10b is made narrower than a flow path surface area of the inflow pipe 21', thereby causing a flow rate of the hydraulic oil when flowing into the filter case 10' to be faster than a flow rate of the hydraulic oil when flowing through the inflow pipe 21'. Thus, the bubbles contained in the hydraulic oil may be more likely to be collected in the center portion of the swirling flow.

Embodiments of the invention have been described in detail with reference to the drawings; however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, a part of the configuration of an embodiment may be replaced with the configuration of another embodiment and the configuration of another embodiment may be added to, deleted from, or replaced with the configuration of an embodiment.

Further, the term "substantially" in the present invention is not to be understood as merely being strictly the same, and is a concept that includes errors and deformations to an extent that does not result in loss in identity. For example, "substantially orthogonal" is not limited to being strictly orthogonal, and is a concept that includes an error of several degrees, for example. Further, simple expressions such as orthogonal, parallel, and matching are not to be understood as merely being strictly orthogonal, parallel, matching, and the like, and include being substantially parallel, substantially orthogonal, substantially matching, and the like.

Furthermore, the meaning of the term "a neighborhood" in the present invention includes a region of a range (which can be determined as desired) near a position serving as a reference. For example, "a neighborhood of the end" refers to a region of a range near the end, and is a concept indicating that the end may or may not be included.

REFERENCE SIGNS LIST 1, 1A, 1B, 1C, 2, 2A Return filter
10, 10' Filter case
10a Bottom surface
10b Opening
11 Lid
12 Elastic member
20, 20A, 20B, 20C, 20D Bubble removing portion
21, 21' Inflow pipe
22 Retainer plate
22a Through-hole
22b Upper surface
23 Retainer plate
23a Through-hole
23b Plate
24 Tube portion
25 Attachment plate
26 Valve
30, 30A, 30B, 30C, 30D Filter element
31 Inner tube
32 Filtration material
33 Valve
34, 35, 36, 36A, 37, 38 Plate
34a, 35a, 37a Inner peripheral surface
35b Lower surface
36a, 38a First tube
36b, 38b Second tube
36c, 36d, 38c Retainer plate
37b Upper surface
40 Outflow portion
41 Outflow pipe
41a Lower end surface
41b Hole
100 Hydraulic oil tank
101 Tank main body
101a Opening
101b Inflow port
101c Outflow port

103 Lid body
104 Suction pipe
105 Bolt
110 Suction strainer

The invention claimed is:

1. A filter apparatus, comprising:
a filter case having a bottomed substantially cylindrical shape;
a bubble removing portion including
an inflow pipe that is provided to a side surface of the filter case, wherein the inflow pipe is configured to cause a liquid to flow into the filter case from a tangential direction at any point on the side surface of the filter case, and produce a swirling flow in the liquid that flowed into the filter case, and
a retainer plate that is provided to an interior of the filter case, wherein the retainer plate is configured to retain bubbles collected in a center of the swirling flow by the swirling flow, and that the retainer plate is positioned on an upper side of the inflow pipe in a height direction;
a filter element that is provided to the interior of the filter case and comprises a filtration material, wherein the filtration material is configured to filter the liquid that passes through the bubble removing portion; and
an outflow pipe that has a substantially cylindrical shape and communicates with a hollow portion of the filter element,
wherein the inflow pipe is provided in a neighborhood of a bottom surface of the filter case, and the retainer plate is provided to a lower side of the filter element.

2. The filter apparatus according to claim 1, wherein
the filter element comprises an upper plate that covers an upper end surface of the filtration material, and a lower plate that covers a lower end surface of the filtration material and is the retainer plate.

3. The filter apparatus according to claim 1, wherein
a diameter of the retainer plate is greater than a diameter of the filtration material.

* * * * *